(12) United States Patent
Anghelescu et al.

(10) Patent No.: US 10,380,052 B2
(45) Date of Patent: Aug. 13, 2019

(54) IMAGE BASED TRANSFER OF WELLSITE DATA BETWEEN DEVICES IN A PETROLEUM FIELD

(71) Applicant: LANDMARK GRAPHICS CORPORATION, Houston, TX (US)

(72) Inventors: Florin M. Anghelescu, Calgary (CA); David Crawshay, Katy, TX (US)

(73) Assignee: LANDMARK GRAPHICS CORPORATION, Houston, TX (US)

( * ) Notice: Subject to any disclaimer, the term of this patent is extended or adjusted under 35 U.S.C. 154(b) by 0 days.

(21) Appl. No.: 15/505,581

(22) PCT Filed: Oct. 1, 2014

(86) PCT No.: PCT/US2014/058642
§ 371 (c)(1),
(2) Date: Feb. 21, 2017

(87) PCT Pub. No.: WO2016/053331
PCT Pub. Date: Apr. 7, 2016

(65) Prior Publication Data
US 2017/0284184 A1    Oct. 5, 2017

(51) Int. Cl.
*G06F 3/00* (2006.01)
*E21B 44/00* (2006.01)
(Continued)

(52) U.S. Cl.
CPC ............ *G06F 13/387* (2013.01); *E21B 44/00* (2013.01); *G05B 19/02* (2013.01); *G06F 3/002* (2013.01); *E21B 47/12* (2013.01)

(58) Field of Classification Search
CPC .......... G06F 3/002; G06F 3/005; G06F 13/00; G06F 13/38; G06F 13/382; G06F 13/385; G06F 13/387; G06F 17/30914; G06F 17/30923; G06F 19/00; G06F 19/26; H04N 1/00334; E21B 44/00; E21B 47/12; G06K 7/10544; G06K 7/1413; G06K 7/1417;
(Continued)

(56) References Cited

U.S. PATENT DOCUMENTS 8,543,234 B2    9/2013   Gao
9,380,060 B2 *  6/2016   Dubois ................. H04L 67/141
(Continued)

OTHER PUBLICATIONS

Victor, Nancy. "Enhancing the Data Capacity of QR Codes by Compressing the Data before Generation". International Journal of Computer Applications (0975-8807). vol. 60—No. 2. Dec. 2012. pp. 17-21 (Year: 2012).*
(Continued)

*Primary Examiner* — Thomas J Cleary (57) ABSTRACT

Systems and methods for enabling wellsite data transfer between petroleum field devices using coded data images, such as matrix barcodes, are provided. Wellsite data is obtained in a first format at a first computing device. The wellsite data is converted from the first format into a second format to be used for matrix barcode generation. At least one matrix barcode is generated based on the converted wellsite data. A representation of the generated matrix barcode is presented via an output device of the first computing device for transfer to a second computing device.

20 Claims, 6 Drawing Sheets

(51) Int. Cl.
   *G05B 19/02* (2006.01)
   *G06F 13/38* (2006.01)
   *E21B 47/12* (2012.01)

(58) Field of Classification Search
   CPC ... G06K 7/1426; G06K 7/1434; G06K 7/1495
   See application file for complete search history.

(56) References Cited

U.S. PATENT DOCUMENTS

| | | |
|---|---|---|
| 2007/0145137 A1 | 6/2007 | Mrowiec |
| 2009/0132458 A1* | 5/2009 | Edwards ............... E21B 44/00 706/50 |
| 2010/0177212 A1 | 7/2010 | Holmes |
| 2011/0284288 A1* | 11/2011 | Sawyer ............... E21B 49/005 175/24 |
| 2012/0067943 A1* | 3/2012 | Saunders ............. G06K 7/1095 235/375 |
| 2012/0249870 A1 | 10/2012 | Senster |
| 2012/0318578 A1 | 12/2012 | Schumacher et al. |
| 2013/0254416 A1* | 9/2013 | Abraham ............ H04L 67/2823 709/230 |

OTHER PUBLICATIONS

Conad, Charles, et al. "Wellsite Support from Afar". Summer 2009. Oilfield Review. Schlumberger. pp. 48-58. (Year: 2009).*

Cotton, David, et al. "Standardization Barriers in the Petroleum Industry". May 4, 2012. University of Colorado, Boulder. (Year: 2012).*

Curtis, Jon. "Gathering Data from the Wellsite using WITSML". 2011. Petrolink International. (Year: 2011).*

"Data standards enhance the digital oil field". Jan. 2012. Petroleum Review. p. 27. (Year: 2012).*

Korean Intellectual Property Office, International Search Report and Written Opinion, dated Jul. 3, 2015, 12 pages, Korea.

* cited by examiner

IMAGE BASED TRANSFER OF WELLSITE DATA BETWEEN DEVICES IN A PETROLEUM FIELD

CROSS-REFERENCE TO RELATED APPLICATIONS

This application is a U.S. national stage patent application of International Patent Application No. PCT/US2014/058642, filed on Oct. 1, 2014, the benefit of which is claimed and the disclosure of which is incorporated herein by reference in its entirety.

FIELD OF THE DISCLOSURE

The present disclosure relates generally to wellsite data collection and reporting and, more specifically, to the transfer of wellsite data between computing devices in a petroleum field.

BACKGROUND

A modern drilling operation for the exploration and production of oil and natural gas generally involves a number of different organizations that are responsible for various aspects of the operation at a wellsite. For example, a variety of service companies and contractors may be used to provide specialized services related to the equipment that may be associated with a drilling rig at the wellsite. During the exploration or production operation, each of these service providers may need to share data related to its activities at the wellsite with one or more of the other service providers. Historically, the exchange or transfer of electronic data between different organizations in the oil and gas industry has been difficult. This difficulty has been primarily due to the use of propriety data formats and strict data access control policies, which may vary from one service company or contractor to another. For example, each service provider may use proprietary computer systems and data formats to collect and store wellsite data produced by various sources, e.g., instrumentation devices on a rig.

Furthermore, the computing devices of each service provider typically have limited network capabilities or only have access to other devices on a private network associated with that particular service provider. For security reasons, some devices used in the field and at the wellsite may be completely "locked down," for example, by disabling all network capabilities and other means for transferring electronic data to other devices (e.g., access to external storage devices, such as through a serial data connection). With such a device, the only option for a service provider to transfer wellsite data from the device to another service provider is to produce a hard copy or printout of the wellsite data. The second service provider would then have to undertake the time-consuming process of manually entering the data into the appropriate computer system of the second provider.

A number of industry standard data formats, including the Wellsite Information Transfer Specification Markup Language (WTTMSL), have been developed to alleviate the need for service providers to support the proprietary formats of other providers. While these standards provide rig operators and oilfield service providers with a platform-independent data format for electronic wellsite data transfer, these standards fail to address the data transfer issues associated with devices that are locked down or have limited/restricted network connectivity or no access to external storage devices.

DESCRIPTION OF ILLUSTRATIVE EMBODIMENTS

Embodiments of the present disclosure relate to transferring wellsite data between computing devices in a petroleum field using matrix or two-dimensional (2D) barcodes. While the present disclosure is described herein with reference to illustrative embodiments for particular applications, it should be understood that embodiments are not limited thereto. Other embodiments are possible, and modifications can be made to the embodiments within the spirit and scope of the teachings herein and additional fields in which the embodiments would be of significant utility. Further, when a particular feature, structure, or characteristic is described in connection with an embodiment, it is submitted that it is within the knowledge of one skilled in the relevant art to effect such feature, structure, or characteristic in connection with other embodiments whether or not explicitly described.

It would also be apparent to one of skill in the relevant art that the embodiments, as described herein, can be implemented in many different embodiments of software, hardware, firmware, and/or the entities illustrated in the figures. Any actual software code with the specialized control of hardware to implement embodiments is not limiting of the detailed description. Thus, the operational behavior of embodiments will be described with the understanding that modifications and variations of the embodiments are possible, given the level of detail presented herein.

In the detailed description herein, references to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

The term "wellsite data" is used herein to refer to the different types of data that may be produced and collected from various sources at a wellsite in a petroleum field. Such data may relate to activities performed at any of the various stages of a well's life cycle including, for example, well planning, drilling, and completion. Examples of such activities include, but are not limited to, daily operations, casing, cementing, perforations, stimulations, pipe tally, and testing of wellbore equipment. As noted above, the wellsite data produced in the field may be from a number of different sources at the wellsite. Such data sources may be associated with different service providers, e.g., service companies and/or specialized contractors, that may be involved in the various operations at the wellsite including, for example, drilling, surveying, wireline testing, completions, production, oilfield planning and analysis. Examples of different sources of wellsite data include, but are not limited to, sensors or other instrumentation devices on a drilling rig in addition to various types of computing devices used by service providers in the field for collecting and reporting data related to inventory tracking (e.g., pipe tally reports) and other activities performed at the wellsite (e.g., daily operations reports). Each service provider may use its own proprietary computer systems, networks, and electronic data formats for representing, storing, and managing wellsite data generally.

Figure 1:
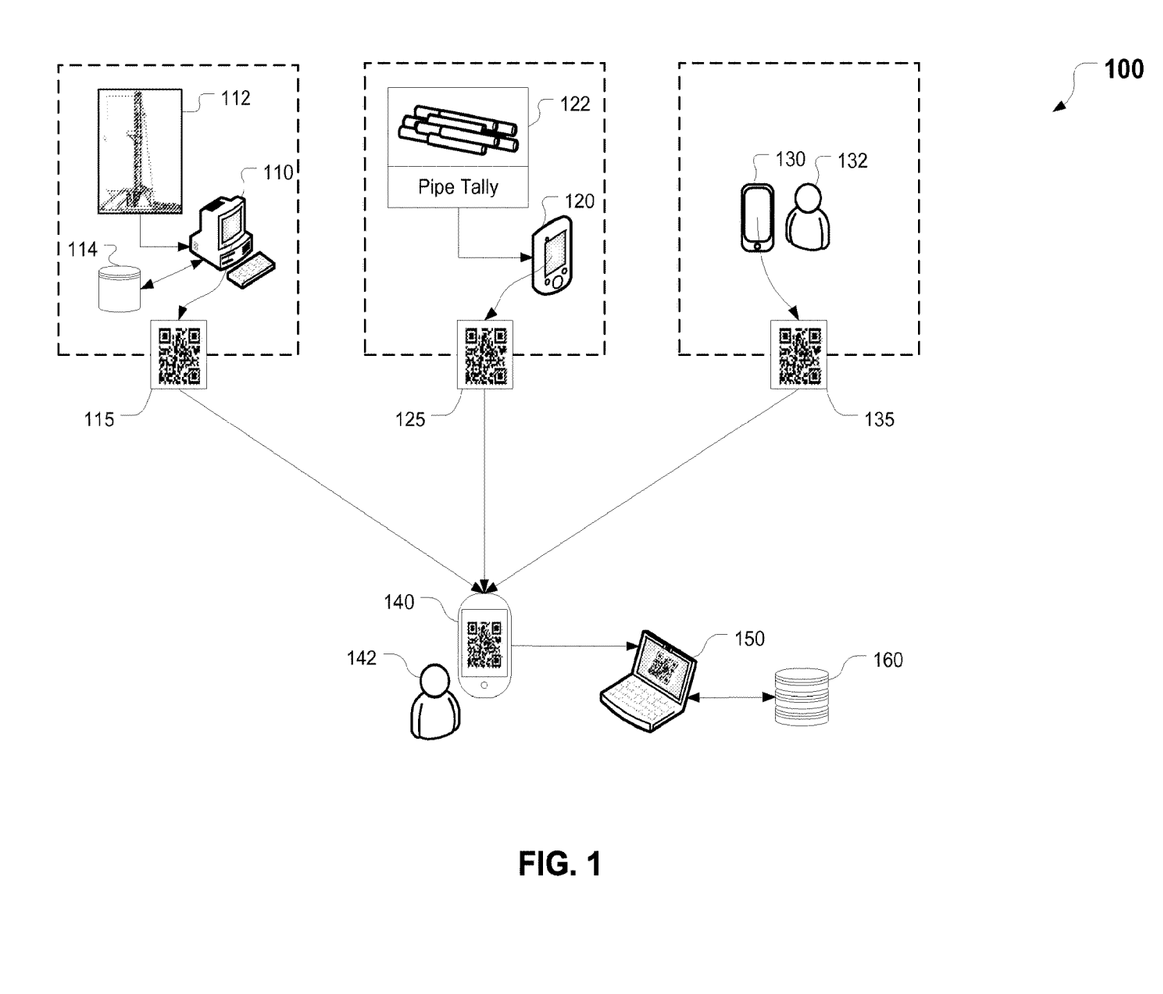
FIG. 1 illustrates an exemplary petroleum field environment in which wellsite data may be transferred between various computing devices using matrix barcodes.

FIG. 1 illustrates an exemplary petroleum field environment 100 in which wellsite data may be transferred between various devices using one or more matrix barcodes. An example of such a matrix barcode includes, but is not limited to, a quick response (QR) code. However, it should be appreciated that embodiments of the present disclosure are not intended to be limited to matrix barcodes and that the disclosed embodiments may be implemented using any type of coded image format for encoding and representing coded data for purposes of transfer between disparate or incompatible computing devices via an optical display/reader interface. As shown in the FIG. 1, environment 100 includes a plurality of computing devices 110, 120, 130, 140 and 150. As will be described in further detail below, computing devices 110, 120, 130, 140, and 150 may be used by, for example, different service providers at a wellsite for collecting and/or reporting data related to different aspects of the drilling and production operations conducted at the wellsite. Also, as will be described in further detail below, computing devices 110, 120, and 130 may be represent different sources of the wellsite data that may be collected and reported to computing device 140. The reporting function performed by each of computing devices 110, 120, 130 may include, for example, transferring the wellsite data to computing device 140 using matrix barcodes 115, 125, and 135, respectively, and without having to use a network connection or an external memory device to enable data transfer between the respective devices, in accordance with the embodiments disclosed herein.

Each of computing devices 110, 120, 130, 140, and 150 may be implemented using any type of computing device having at least one processor and a memory in the form of a computer-readable storage medium for storing data and instructions that can be read and executed by the processor. Such a computing device may also include an input/output (I/O) interface for receiving user input or commands via a user input device (e.g., a mouse, QWERTY or T9 keyboard, touch-screen, or microphone). The I/O interface may also be used by each computing device to output or present information to a user via an output device. The output device may be, for example, a display coupled to or integrated with the computing device for displaying a digital representation of the information being presented to the user. Alternatively, the output device may be a printer coupled to the device for printing a physical paper copy of the presented information. In an embodiment, the presented information output via the display or printer may include one or more matrix barcodes (e.g., one or more QR codes) generated based on wellsite data to be transferred to another device, as will be described in further detail below.

In the example shown in FIG. 1, computing device 110 may be, for example, a desktop or workstation while computing devices 120, 130, and 140 may be different types of mobile devices (e.g., smartphones, tablet device, portable digital assistant (PDA) or similar type of mobile device). Computing device 150 may be, for example, a laptop computer for receiving wellsite data from computing device 140. As shown in FIG. 1, computing device 150 may be communicatively coupled to a database 160. Database 160 may be, for example, a local or remote data store used for storing wellsite data collected from one or more sources at the wellsite, e.g., as reported by computing devices 110, 120, and/or 130.

In an embodiment, computing devices 140 and 150 may be associated with the same service provider, e.g., an oilfield services company responsible for supervising wellsite operations. For example, devices 140 and 150 may be different devices used by the service provider at different locations in the petroleum field. Device 140 may be a mobile device used by company personnel located at the wellsite while device 150 may be a laptop computer used by personnel in an office building used by the company as a centralized management facility for operations in the petroleum field. Thus, database 160 may be, for example, a centralized repository for different types of wellsite data maintained by the service company and made accessible to other computing devices on the service provider's private network.

Conversely, computing devices 110, 120, and 130 may be associated with different third-party service providers that have disparate communication networks and systems, e.g., specialized contractors that provide services and support for particular pieces of equipment used at the wellsite. Further, each service provider may use, for example, a proprietary data format that may be specific to that provider's computer systems. In an embodiment, each of computing devices 110, 120, 130, and 140 may have limited network connectivity or restricted access to devices and networks that are external to the private network of the particular service provider associated with that device. Thus, computing devices 110, 120, 130, and 140 may not be able to use a network connection for transferring or exchanging electronic data with each other or with other devices on a different service provider's network. In an embodiment, the networking capabilities and access to peripheral devices (e.g., memory cards or other external data storage devices) of computing device 140 and one or more of computing devices 110, 120, and 130 may be completely disabled or "locked down" for security reasons, thereby preventing each locked down device from establishing any type of data connection with other devices, including other devices on the same provider's network.

In an embodiment, computing device 110 may be part of a data collection and reporting system associated with a drilling rig 112. Drilling rig 112 may be any type of on-shore or off-shore drilling rig used to drill wells in subterranean formations, e.g., for purposes of hydrocarbon exploration, production, or stimulation operations in a petroleum field. Drilling rig 112 may be equipped with various instrumentation devices, e.g., down-hole sensors, for capturing data related to different parameters of the particular drilling operation. Computing device 110 in this example may be communicatively coupled to drilling rig 112 or one or more instrumentation devices thereof for purposes of collecting and reporting the captured data. The wellsite data produced by an instrumentation device may be in, for example, a proprietary format associated with a particular oilfield service provider or contractor responsible for operating and maintaining the particular instrumentation device. The wellsite data produced by the instrumentation devices of drilling rig 112 may be collected and/or reported by computing device 110 on a periodic or per-event basis, for example, based on commands input by a user of computing device 110. In some implementations, the collection and reporting may occur in real time, e.g., as part of a real-time monitoring function performed by computing device 110. The instrumentation data collected by computing device 110 may be stored to a database 114 that is communicatively coupled to device 110. Like database 160 described above, database 114 may be, for example, a local or remote database used to store wellsite data. However, database 114 may be accessible only to computing device 110 and other devices on the private network of the third-party service provider associated with device 110.

As described above, computing device 110 and/or computing device 140 may have limited or restricted networking capabilities. As such, it may not be possible for computing device 110 to transfer wellsite data to computing device 140 via a traditional network. In an embodiment, computing device 110 may generate a matrix barcode 115 for transferring the wellsite data to computing device 140. Matrix barcode 115 may be generated by device 110 as a single matrix barcode (e.g., a single QR code symbol) or a matrix barcode stream including a plurality of matrix barcodes (e.g., a QR code stream including a series of QR codes). In an embodiment, matrix barcode 115 may be presented for transfer to computing device 140 via a display of computing device 110. Alternatively, device 110 may output matrix barcode 115 via a printer coupled to device 110. Matrix barcode 115 may be printed as part of, for example, a paper report related to the instrumentation data collected for drilling rig 112. Matrix barcode 115 presented by device 110 may be transferred to device 140 via an image capture device, e.g., a digital camera, or a matrix barcode scanner coupled to device 140.

As noted above, computing device 120 may represent another source of wellsite data in addition to device 110. In an embodiment, computing device 120 may be part of, for example, a mobile inventory tracking system for different types of equipment that may be used at the wellsite, e.g., for wellsite operations conducted with drilling rig 112. As shown in FIG. 1, such a mobile inventory tracking system may be, for example and without limitation, a mobile pipe tally system for tracking drill pipe, casing, and tubing information as the equipment arrives at drilling rig 112 or is run into the borehole. Device 120 in this example may be used by, for example, a casing-hand or well engineer to record measurements of pipe joints being unloaded from a transport vehicle or vessel as well as those being run into the hole. The measurements recorded by device 120 may be stored as pipe tally data 122 in, for example, an internal memory of device 120. Alternatively, pipe tally data 122 may be stored in an external data store or removable storage device coupled to device 120. Pipe tally data 122 may then be used by device 120 to generate various pipe tally reports. In an embodiment, pipe tally data 122 or a pipe tally report generated therefrom may be converted by device 120 into one or more matrix barcodes 125, which can be transferred to device 140. Matrix barcode(s) 125 may be generated using, for example, the above-described technique used by device 110 to generate matrix barcode 115.

Also, as noted above, computing device 130 may represent yet another source of wellsite data. In an embodiment, a user 132 may use computing device 130 to track daily activities performed at the wellsite, e.g., workover and intervention operations conducted at drilling rig 112. In an example, each daily 24-hour period of activity may be divided into two 12-hour shifts. User 132 in this example may be a well engineer responsible for the first 12-hour day shift while user 142 may be responsible for the second 12-hour shift. Thus, user 132 may need to report the activities performed during the first 12-hour shift to user 142, e.g., as part of a daily hand-off procedure between shifts. Due to the networking limitations of device 130 and/or device 140, as described above, device 130 may be used to generate a matrix barcode 135, which can be used to transfer the 12-hour shift data to device 140. Once the data has been transferred to device 140, the activities for both 12-hour shifts may be uploaded into a data management system for tracking daily operations conducted at the wellsite. This may involve, for example, transferring the data from device 140 to device 150, e.g., by using another matrix barcode generated by device 140 for this purpose, which can be presented on a display of device 140 and captured by an image capture device or matrix barcode scanner of device 150.

Additional details regarding the transfer of wellsite data between device 140 and each of devices 110, 120, and 130 using matrix barcodes will be described in further detail below in reference to FIG. 2.

Figure 2:
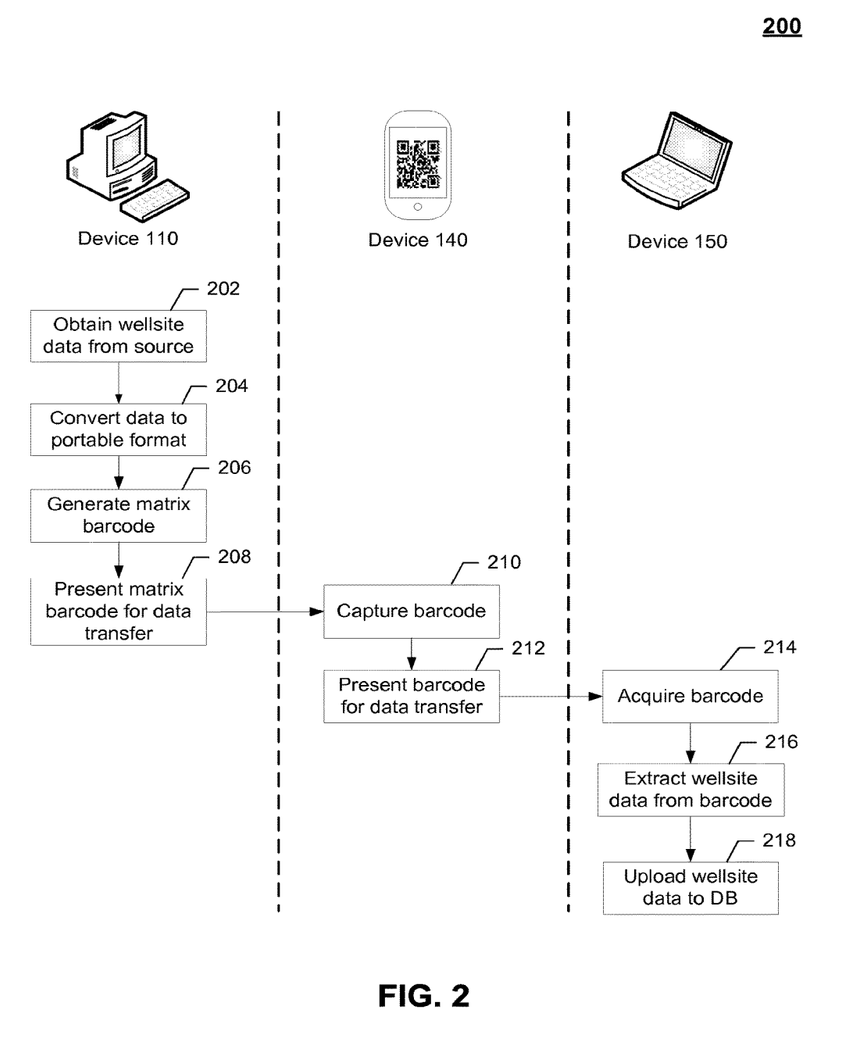
FIG. 2 illustrates an exemplary process flow for transferring wellsite data between the petroleum field devices of FIG. 1 using matrix barcodes.

FIG. 2 illustrates an exemplary process flow 200 for transferring wellsite data between the petroleum field devices of FIG. 1 using matrix barcodes (e.g., matrix barcodes 115, 125, or 135). For discussion purposes, the transfer of wellsite data is shown in FIG. 2 as originating from computing device 110 and continuing to computing devices 140 and 150. However, it should be noted that process flow 200 is not intended to be limited thereto and that the wellsite data being transferred may originate from another computing device (e.g., computing device 120 or 130 of FIG. 1) corresponding to a different data source, as described above.

As shown in step 202 of FIG. 2, device 110 obtains wellsite data from a source at the wellsite. The source may be, for example, an instrumentation device of a drilling rig, e.g., drilling rig 112 of FIG. 1, as described above. In an embodiment, the wellsite data is generated by the data source in a proprietary format. Accordingly, in step 204, device 110 converts the wellsite data from the proprietary format to a "portable" data format. Such a portable data format may include, for example, any platform-independent data format that is not specific to any particular computing system. In an embodiment, such a portable format may be, for example, a text-based data format conforming to an industry standard format for electronic data exchange/transfer of wellsite information. An example of such an industry standard data format is the Wellsite Information Transfer Specification Markup Language (WITSML) format. However, it should be noted that embodiments of the present disclosure are not intended to be limited thereto and that any other text-based or extensible markup language (XML) based data format may be used instead.

In step 206, a matrix barcode is generated from the converted wellsite data. The generated matrix barcode is then presented in step 208 via an output device of computing device 110 for transfer to computing device 140. As described above, the output device may be a display for presenting a digital representation of the matrix barcode or a printer for printing a physical copy of the matrix barcode, e.g., as part of a report generated by computing device 110.

In step 210, computing device 140 captures the matrix barcode using an image capture device, such as a digital camera, or matrix barcode scanner device coupled to computing device 140. As will be described in further detail below, a matrix barcode reader application executable at computing device 140 also may be used for capturing the matrix barcode, e.g., as it is displayed on a monitor or display of computing device 110 or printed on a physical piece of paper. In step 212, computing device 140 may present the captured matrix barcode for further transfer to computing device 150.

In step 214, computing device 150 acquires the matrix barcode from computing device 140. Like device 140, device 150 may acquire the matrix barcode by capturing a digital representation or image of the matrix barcode using an image capture device or matrix barcode scanner coupled to device 150. Also, like device 140, the image capture device or scanner may be utilized by a matrix barcode reader executable at device 150 for capturing the matrix barcode. In step 216, computing device 150 extracts the wellsite data from the matrix barcode captured in step 214. This may include, for example, converting the extracted wellsite data from the compressed binary format described above into a portable text-based (e.g., XML) format or a proprietary format used by the service company or provider associated with computing device 150, as described above. The extracted wellsite data may then be uploaded in step 218 to a database (e.g., database 160 of FIG. 1) for storage and later use, e.g., as part of a wellsite data management system of the service company or provider in this example.

Figure 3:
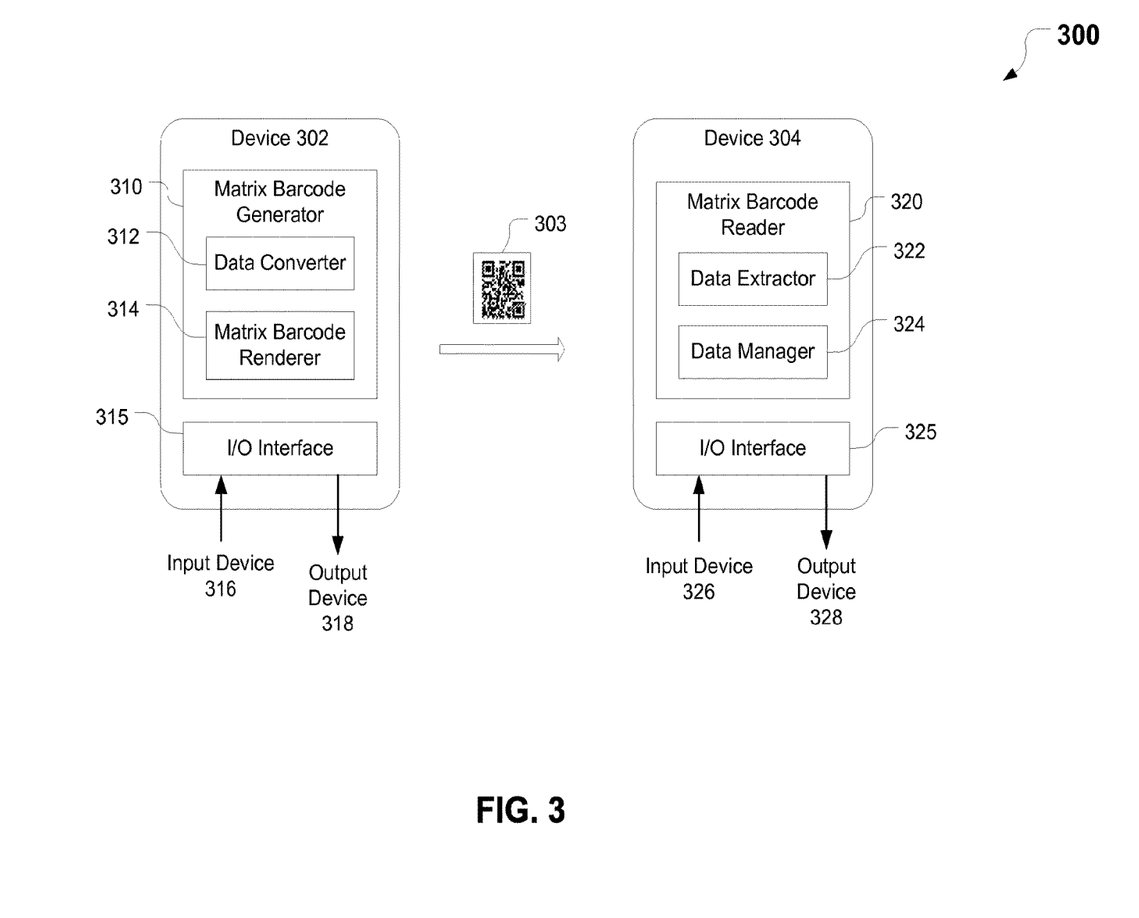
FIG. 3 illustrates an exemplary system for transferring wellsite data between petroleum field devices using matrix barcodes.

FIG. 3 illustrates an exemplary system 300 for transferring wellsite data between computing devices in a petroleum field using matrix barcodes. In the example shown in FIG. 3, a computing device 302 transfers wellsite data in the form of a matrix barcode 303 to a computing device 304. Referring back to FIGS. 1 and 2, device 302 may be used to implement, for example, computing device 110, and device 304 may be used to implement, for example, computing device 140. As shown in FIG. 3, device 302 includes a matrix barcode generator 310 and an I/O interface 315. Device 304 includes a matrix barcode reader 320 and an I/O interface 325. In an embodiment, devices 302 and 304 may be associated with disparate computing systems that lack interoperability, as described above.

Devices 302 and 304 may use I/O interfaces 315 and 325, respectively, for performing various data input and output functions. For example, device 302 may use I/O interface 315 to receive input from an input device 316 and also, to output information to an output device 318. Input device 316 may be, for example, a user input device including, but not limited to, a mouse, QWERTY keyboard, touch-screen, microphone, or a T9 keyboard. Output device 318 may be, for example, a display or printer. In some implementations, input device 316 and output device 318 may be a single device, e.g., a touch-screen display, which can be used for both input and output. It should be appreciated that other types of input and output devices may also be supported by each of devices 302 and 304. It should also be appreciated that in the interest of clarity, many of the components that would generally be part of an actual implementation are excluded from the example shown in FIG. 3. Thus, each of devices 302 and 304 may include any number of additional components for implementing the matrix barcode based data transfer functionality disclosed herein.

As shown in FIG. 3, matrix barcode generator 310 includes a data converter 312 and a matrix barcode renderer 314. In an embodiment, matrix barcode generator 310 obtains wellsite data from a data source at the wellsite. The data source may be, for example, an instrumentation device of a drilling rig (e.g., drilling rig 112 of FIG. 1, as described above). In an example, device 302 may communicate with the instrumentation device on a periodic basis or per-event basis, e.g., based on commands received from a user via I/O interface 315. The wellsite data obtained from the instrumentation device in this example may be in a proprietary format. The proprietary format may be associated with, for example, the particular service provider responsible for operating the instrumentation device.

In an embodiment, data converter 312 converts the wellsite data from the proprietary format to a portable text-based format (e.g., WITSML), as described above. The converted wellsite data may then be used by data converter 312 to generate at least one matrix barcode 303. Matrix barcode 303 may be generated using any of various well-known encoding formats for creating matrix barcodes of various sizes and levels of error correction. In an embodiment, matrix barcode 303 is a matrix barcode stream including a plurality of matrix barcodes generated by data converter 312 based on the converted wellsite data. Multiple matrix barcodes may need to be generated if, for example, the size of the converted wellsite data is greater than the maximum storage capacity of a single matrix barcode symbol, e.g., depending on the encoding format that is used, dimensions of the matrix barcode being generated, and selected error-correction level.

In a further embodiment, the conversion operation performed by data converter 312 may also include generating a binary version of the wellsite data that has been converted into the portable text-based format. Data converter 312 may also use a binary data compression format to compress the binary wellsite data and generate a compressed binary representation of the converted wellsite data. The compressed data may then be embedded into one or more matrix barcodes generated by data converter 312. This would allow a larger amount of data to be embedded within each matrix barcode that is generated.

In an embodiment, matrix barcode renderer 314 uses I/O interface 315 to present a representation of the generated matrix barcode 303 via output device 318 and thereby, enable the wellsite data embedded in matrix barcode 303 to be transferred to device 304. In an embodiment, output device 318 may be a display (e.g., a monitor or LED display) of device 302 and the representation of matrix barcode 303 is a digital image of matrix barcode 303 presented on the display. In another embodiment, output device 318 may be a printer and the representation of matrix barcode 303 is a printed image of matrix barcode 303 on a physical medium, such as paper.

In an embodiment, matrix barcode reader 320 of device 304 uses I/O interface 325 to capture matrix barcode 303 as presented by device 302 via an input device 326. Input device 326 may be, for example, an image capturing device, e.g., a digital camera, or matrix barcode scanner coupled to device 304. As shown in FIG. 3, matrix barcode reader 320 includes a data extractor 322 and a data manager 324. In an embodiment, data extractor 322 processes the captured matrix barcode 303 to extract the wellsite data embedded therein. The extracted wellsite data may then be converted by data extractor 322 from one format to another. This may include uncompressing the wellsite data, e.g., if it were compressed prior to being encoded as part of the generated matrix barcode 303, as described above. In an embodiment, the wellsite data may be converted from a compressed binary format to a portable text-based format (e.g., WITSML). Alternatively, the wellsite data may be converted into another proprietary format that is used by the service provider associated with device 304 and that is different from the proprietary format used by the service provider associated with device 302 and rig instrumentation device described above.

In an embodiment, data manager 324 uploads the converted wellsite data to a database (e.g., database 160 of FIGS. 1 and 2, as described above) for storage and later use. While not shown in FIG. 3, device 304 may include a network communications interface capable of receiving and transmitting data over a local or wide-area electronic network, e.g., a private network of the associated service provider. The network interface may be used by data manager 324 to transmit the wellsite data to the database.

It should be appreciated that device 304 may also be capable of displaying or otherwise presenting another representation of matrix barcode 303 via an output device 328 for purposes of transferring matrix barcode 303 and the corresponding wellsite data to another computing device. The other device may be, for example, on the same private network as device 304. However, the matrix barcode based data transfer functionality described herein may be useful when, for example, there may be limited or no network connectivity available to either device.

Matrix barcode generator 310 and matrix barcode reader 320 may each be implemented as, for example, components of a wellsite data collection and reporting application executable at device 302 and device 304, respectively. While matrix barcode generator 310 is shown in FIG. 3 only with respect to device 302, it should be noted that device 304 may include a matrix barcode generator in addition to matrix barcode reader 320 for implementing the matrix barcode generation functionality described above. Likewise, while matrix barcode reader 320 is shown in FIG. 3 only with respect to device 304, it should be noted that device 302 may include a matrix barcode reader in addition to matrix barcode generator 310 for implementing the matrix barcode reading/capture and data extraction functionality described above. Thus, referring back to FIGS. 1 and 2, each of computing devices 110, 120, 130, 140, and 150 may implemented using, for example, one or both of matrix barcode generator 310 and matrix barcode reader 320 of devices 302 and 304, respectively, as described above.

Figure 4:
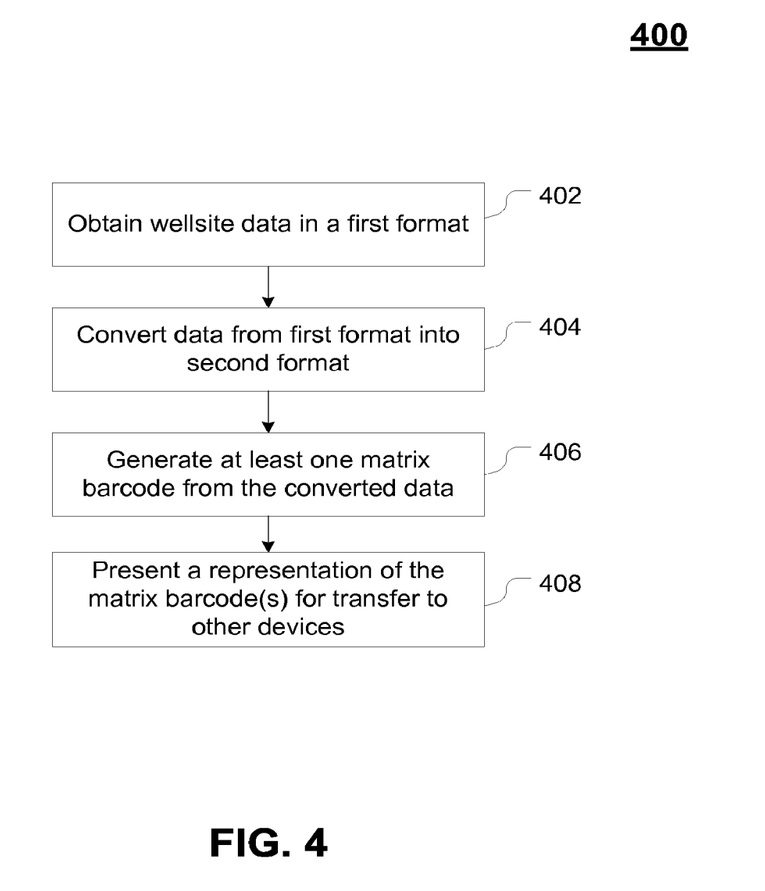
FIG. 4 is a process flowchart of an exemplary method for enabling wellsite data transfer between petroleum field devices using matrix barcodes.

FIG. 4 is a process flowchart of an exemplary method 400 for enabling wellsite data transfer between petroleum field devices using matrix barcodes. Method 400 includes steps 402, 404, 406, and 408. For discussion purposes, method 400 will be described using system 100 of FIG. 1, as described above, but is not intended to be limited thereto. Also, for discussion purposes, method 400 will be described using system 300 of FIG. 3, as described above. For example, the steps of method 400 may be performed by matrix barcode generator 310 of FIG. 3. However, method 400 is not intended to be limited thereto.

Method 400 begins in step 402, in which wellsite data is obtained in a first format. The first format may be a data format associated with the particular source of the wellsite data. Such a source format may be, for example, a proprietary data format used by a particular service provider associated with an instrumentation device or sensor of a drilling rig (e.g., drilling rig 112 of FIG. 1) at the wellsite, as described above. In step 404, the obtained wellsite data is converted from the first format into a second format to be used for matrix barcode generation. The second format may be, for example, a portable text-based data format. The portable text-based data format may be based on, for example, an extensible markup language (XML) standard for wellsite information transfer (e.g., WITSML), as described above.

In step 406, at least one matrix barcode is generated based on the converted wellsite data. In an embodiment, step 404 may include converting the wellsite data from the portable text-based data format into binary data and compressing the binary data using a binary data compression format to generate a compressed binary representation of the wellsite data. Further, step 406 may include, for example, embedding the compressed wellsite data into the matrix barcode being generated.

In step 408, a representation of the generated matrix barcode is presented via an output device for transfer to one or more other computing devices. As described above, the output device may be a display, and the representation of the matrix barcode may be a digital image of the matrix barcode presented via the display for transfer to a second computing device via a digital image capture device of the second computing device. The digital image capture device of the second computing device may be, for example, a digital camera utilized by a matrix barcode reader application (e.g., matrix barcode reader 320 of FIG. 3, as described above) executable at the second computing device.

In an embodiment, the matrix barcode generated in step 406 may be a matrix barcode stream including a plurality of matrix barcodes, and the digital image presented via the display is an animated bitmap representation of the matrix barcode stream, e.g., as an animated Graphics Interchange Format (GIF) image. In a further embodiment, the digital image presented via the display may be a digital video including a plurality of image frames, where different image frames may represent one or more of the plurality of matrix barcodes in the matrix barcode stream. For example, each image frame may be used to display a different one of the plurality of matrix barcodes. Alternatively, consecutive image frames may be used to display the same matrix barcode for a suitable period of time to ensure that the image of the matrix barcode is properly read.

Figure 5:
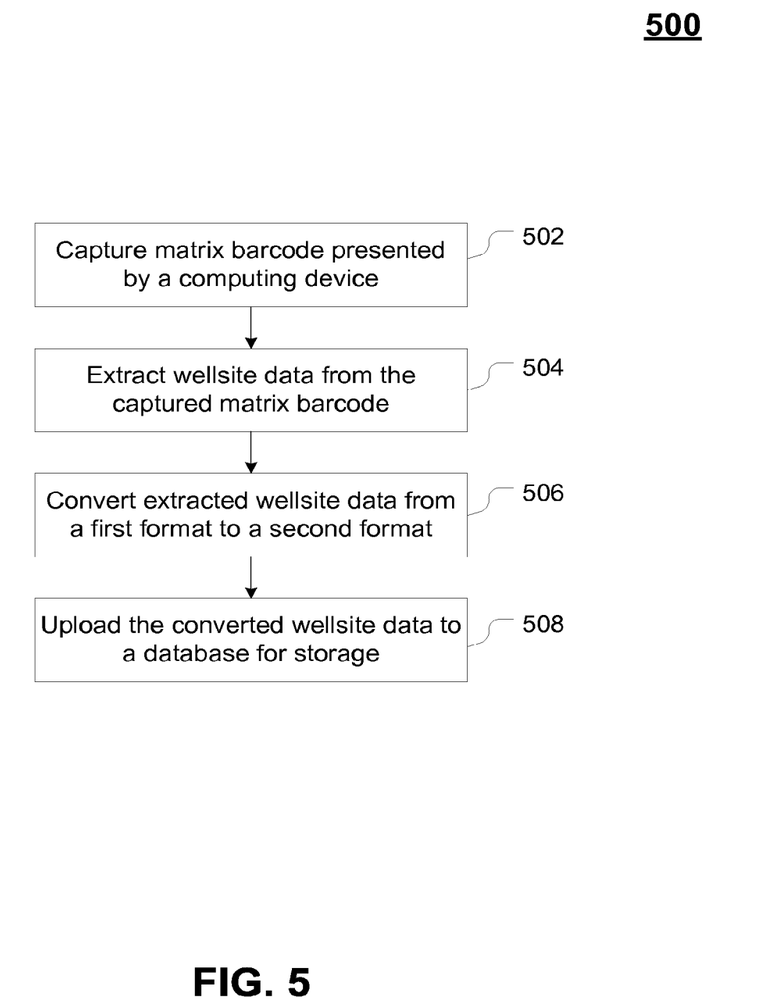
FIG. 5 is a process flowchart of another exemplary method for enabling wellsite data transfer between petroleum field devices using matrix barcodes.

FIG. 5 is a process flowchart of another exemplary method 500 for enabling wellsite data transfer between petroleum field devices using matrix barcodes. Method 500 includes steps 502, 504, 506, and 508. For discussion purposes, method 500 will be described using system 100 of FIG. 1, as described above, but is not intended to be limited thereto. Also, for discussion purposes, method 500 will be described using system 300 of FIG. 3, as described above. For example, the steps of method 500 may be performed by matrix barcode reader 320 of FIG. 3. However, method 500 is not intended to be limited thereto.

Method 500 begins in step 502, which includes capturing a matrix barcode presented on a display of a computing device. The matrix barcode may be captured using, for example, an image capture device, e.g., a digital camera, or dedicated matrix barcode scanner. The captured matrix barcode in this example may have been presented on a display of the computing device. Alternatively, the matrix barcode may be printed on a sheet of paper or other physical medium, and the printed matrix barcode may be captured using the same image capture device or matrix barcode scanner. In step 504, wellsite data is extracted from the captured matrix barcode. The extracted wellsite data may then be converted into a portable text-based format in step 506 and uploaded to a database system for data storage and management purposes.

Figure 6:
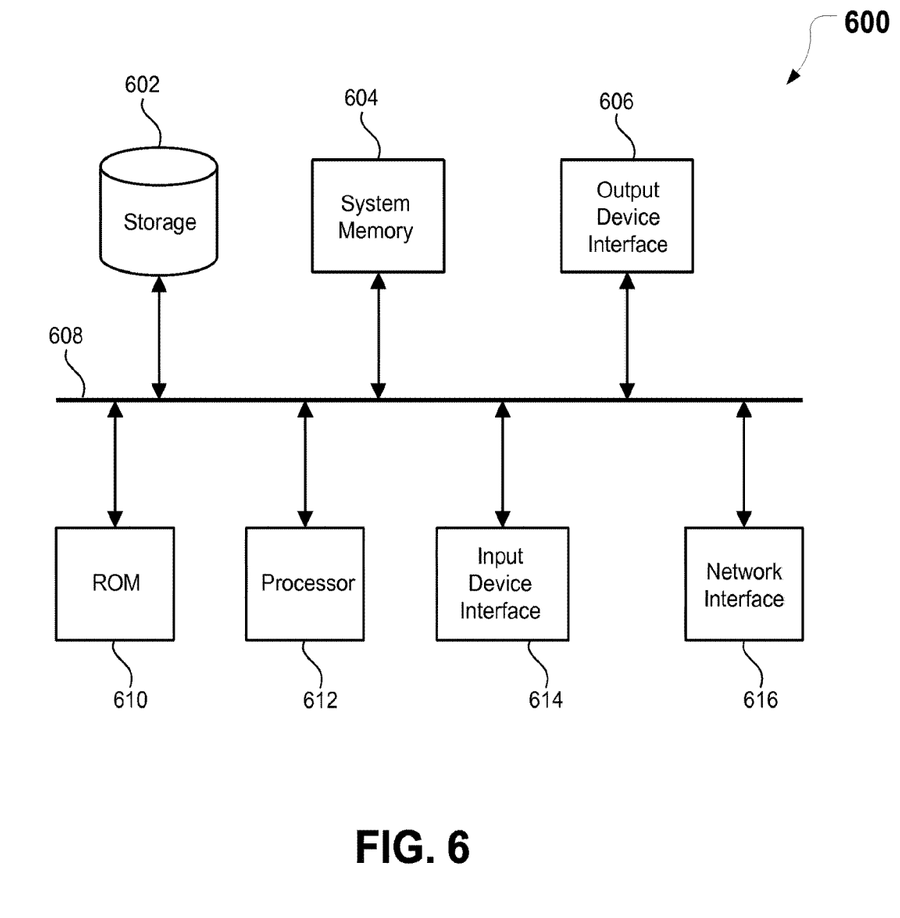
FIG. 6 is a block diagram of an exemplary computer system in which embodiments of the present disclosure may be implemented.

FIG. 6 is a block diagram of an exemplary computer system 600 in which embodiments of the present disclosure may be implemented. System 600 can be a computer, phone, PDA, or any other type of electronic device. Such an electronic device includes various types of computer readable media and interfaces for various other types of computer readable media. As shown in FIG. 6, system 600 includes a permanent storage device 602, a system memory 604, an output device interface 606, a system communications bus 608, a read-only memory (ROM) 610, processing unit(s) 612, an input device interface 614, and a network interface 616.

Bus 608 collectively represents all system, peripheral, and chipset buses that communicatively connect the numerous internal devices of system 600. For instance, bus 608 communicatively connects processing unit(s) 612 with ROM 610, system memory 604, and permanent storage device 602.

From these various memory units, processing unit(s) 612 retrieves instructions to execute and data to process in order to execute the processes of the subject disclosure. The processing unit(s) can be a single processor or a multi-core processor in different implementations.

ROM 610 stores static data and instructions that are needed by processing unit(s) 612 and other modules of system 600. Permanent storage device 602, on the other hand, is a read-and-write memory device. This device is a non-volatile memory unit that stores instructions and data even when system 600 is off. Some implementations of the subject disclosure use a mass-storage device (such as a magnetic or optical disk and its corresponding disk drive) as permanent storage device 602.

Other implementations use a removable storage device (such as a floppy disk, flash drive, and its corresponding disk drive) as permanent storage device 602. Like permanent storage device 602, system memory 604 is a read-and-write memory device. However, unlike storage device 602, system memory 604 is a volatile read-and-write memory, such as random access memory. System memory 604 stores some of the instructions and data that the processor needs at runtime. In some implementations, the processes of the subject disclosure are stored in system memory 604, permanent storage device 602, and/or ROM 610. For example, the various memory units include instructions for automatically determining data items for a coincident event in accordance with some implementations. From these various memory units, processing unit(s) 612 retrieves instructions to execute and data to process in order to execute the processes of some implementations.

Bus 608 also connects to input and output device interfaces 614 and 606. Input device interface 614 enables the user to communicate information and select commands to the system 600. Input devices used with input device interface 614 include, for example, alphanumeric, QWERTY, or T9 keyboards, microphones, and pointing devices (also called "cursor control devices"). Output device interfaces 606 enables, for example, the display of images generated by the system 600. Output devices used with output device interface 606 include, for example, printers and display devices, such as cathode ray tubes (CRT), liquid crystal displays (LCD), and light emitting diode (LED) displays. Some implementations include devices such as a touch-screen that functions as both input and output devices. It should be appreciated that embodiments of the present disclosure may be implemented using a computer including any of various types of input and output devices for enabling interaction with a user. Such interaction may include feedback to or from the user in different forms of sensory feedback including, but not limited to, visual feedback, auditory feedback, or tactile feedback. Further, input from the user can be received in any form including, but not limited to, acoustic, speech, or tactile input. Additionally, interaction with the user may include transmitting and receiving different types of information, e.g., in the form of documents, to and from the user via the above-described interfaces.

Also, as shown in FIG. 6, bus 608 also couples system 600 to a public or private network (not shown) or combination of networks through a network interface 616. Such a network may include, for example, a local area network ("LAN"), such as an Intranet, or a wide area network ("WAN"), such as the Internet. Any or all components of system 600 can be used in conjunction with the subject disclosure.

These functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media can store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, such as application specific integrated circuits (ASICs) or field programmable gate arrays (FPGAs). In some implementations, such integrated circuits execute instructions that are stored on the circuit itself. Accordingly, the steps of exemplary methods 400 and 500 of FIGS. 4 and 5, respectively, as described above, may be implemented using system 600 of FIG. 6, as described above, or any computer system including processing circuitry or a computer program product including instructions which, when executed by at least one processor, causes the processor to perform functions relating to these methods.

As used in this specification and any claims of this application, the terms "computer", "server", "processor", and "memory" all refer to electronic or other technological devices. These terms exclude people or groups of people. As used herein, the terms "computer readable medium" and "computer readable media" refer generally to tangible, physical, and non-transitory electronic storage mediums that store information in a form that is readable by a computer.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., a web page) to a client device (e.g., for purposes of displaying data to and receiving user input from a user interacting with the client device). Data generated at the client device (e.g., a result of the user interaction) can be received from the client device at the server.

It is understood that any specific order or hierarchy of steps in the processes disclosed is an illustration of exemplary approaches. Based upon design preferences, it is understood that the specific order or hierarchy of steps in the processes may be rearranged, or that all illustrated steps be performed. Some of the steps may be performed simultaneously. For example, in certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Furthermore, the exemplary methodologies described herein may be implemented by a system including processing circuitry or a computer program product including instructions which, when executed by at least one processor, causes the processor to perform any of the methodology described herein.

As described above, embodiments of the present disclosure may be used to enable wellsite data transfer between petroleum field devices using coded data images. In one embodiment of the present disclosure, a computer-implemented method for enabling wellsite data transfer between petroleum field devices using coded data images includes: obtaining wellsite data in a first format at a first computing device; converting the obtained wellsite data from the first format into a second format to be used for coded data image generation; generating at least one coded data image based on the converted wellsite data; and presenting via an output device of the first computing device a representation of the generated coded data image for transfer to a second computing device.

In a further embodiment, the first and second computing devices are associated with disparate computing systems that lack interoperability. In yet a further embodiment, the first format is a proprietary data format supported by only the first computing device and the second format is a portable text-based data format supported by each of the first and second computing devices. In yet a further embodiment, the portable text-based data format is based on an extensible markup language (XML) standard for wellsite information transfer. In yet a further embodiment, the above-described method includes: converting the wellsite data from the proprietary data format into the portable text-based format; generating a binary version of the converted wellsite data in the portable text-based data format; and compressing the binary version of the wellsite data using a binary data compression format to generate a compressed binary representation of the wellsite data, wherein generating at least one coded data image includes embedding the compressed wellsite data into the coded data image being generated.

In yet a further embodiment, the output device is a display of the first computing device, and the representation of the coded data image is a digital image of the coded data image presented via the display for transfer to the second computing device via a digital image capture device of the second computing device. In yet a further embodiment, the second computing device is configured to capture the coded data image presented on the display of the first computing device via the digital image capture device, extract the wellsite data from the captured coded data image, convert the extracted wellsite data into a portable text-based format, and transmit the converted wellsite data to a database system for storage and later use. In yet a further embodiment, the coded data image is a matrix barcode and the digital image capture device of the second computing device is a digital camera utilized by a matrix barcode reader application executable at the second computing device. In yet a further embodiment, generating at least one matrix barcode comprises generating a matrix barcode stream including a plurality of matrix barcodes and the digital image presented via the display is an animated bitmap representation of the matrix barcode stream. In yet a further embodiment, the digital image presented via the display is a digital video including a plurality of image frames representing one or more of the plurality of matrix barcodes in the matrix barcode stream.

In another embodiment of the present disclosure, a system for enabling wellsite data transfer between petroleum field devices using coded data images comprises at least one processor and a memory including instructions stored therein, which when executed by the processor, cause the processor to perform functions including functions to: obtain wellsite data in a first format at a first computing device; convert the obtained wellsite data from the first format into a second format to be used for coded data image generation; generate at least one coded data image based on the converted wellsite data; and present via an output device of the first computing device a representation of the generated coded data image for transfer to a second computing device.

In yet another embodiment of the present disclosure, a computer-readable storage medium having instructions stored therein, which when executed by a processor cause the processor to execute functions, including functions to: obtain wellsite data in a first format at a first computing device; convert the obtained wellsite data from the first format into a second format to be used for coded data image generation; generate at least one coded data image based on the converted wellsite data; and present via an output device of the first computing device a representation of the generated coded data image for transfer to a second computing device.

Although various embodiments and methodologies have been shown and described, the present disclosure is not limited to such embodiments and methodologies and will be understood to include all modifications and variations as would be apparent to one skilled in the art. Therefore, it should be understood that this disclosure is not intended to be limited to the particular forms disclosed. Rather, the intention is to cover all modifications, equivalents and alternatives falling within the spirit and scope of the disclosure as defined by the appended claims.

What is claimed is:

1. A computer-implemented method for enabling wellsite data transfer between petroleum field devices using coded data images, the method comprising:
    obtaining, by a first mobile device located at a wellsite in a petroleum field, wellsite data in a first format supported by only a first of a plurality of service providers at the wellsite;
    converting, by the first mobile device, the obtained wellsite data from the first format into a second format supported by a second service provider at the wellsite;
    generating, by the first mobile device, at least one coded data image based on the converted wellsite data; and
    presenting, by the first mobile device via a display of the first mobile device, a representation of the generated coded data image for transfer to a second mobile device located at the wellsite via an image capture device of the second mobile device, wherein the second mobile device is associated with the second service provider.

2. The method of claim 1, wherein the first and second formats are proprietary data formats associated with computing systems of the respective first and second service providers.

3. The method of claim 1, wherein the first format is a proprietary data format supported by only the first service provider, and the second format is a portable text-based data format supported by each of the first and second service providers.

4. The method of claim 3, wherein the portable text-based data format is based on an extensible markup language (XML) standard for wellsite information transfer.

5. The method of claim 3, wherein converting the wellsite data from the first format into the second format comprises:
    converting the wellsite data from the proprietary data format into the portable text-based format;
    generating a binary version of the converted wellsite data in the portable text-based data format; and
    compressing the binary version of the wellsite data using a binary data compression format to generate a compressed binary representation of the wellsite data, and wherein generating at least one coded data image includes embedding the compressed binary representation of the wellsite data into the coded data image being generated.

6. The method of claim 1, wherein the image capture device of the second mobile device is a digital image capture device, and the representation of the coded data image is a digital image of the coded data image presented via the display of the first mobile device for transfer to the second mobile device via the digital image capture device of the second mobile device.

7. The method of claim 6, wherein the second mobile device is configured to:
    capture the coded data image presented on the display of the first mobile device via the digital image capture device;
    extract the wellsite data from the captured coded data image;
    convert the extracted wellsite data into a portable text-based format; and
    transmit the converted wellsite data to a database system for storage and later use.

8. The method of claim 6, wherein the coded data image is a matrix barcode and the digital image capture device of the second mobile device is a digital camera utilized by a matrix barcode reader application executable at the second mobile device.

9. The method of claim 8, wherein generating at least one coded data image comprises generating a matrix barcode stream including a plurality of matrix barcodes and the digital image presented via the display is an animated bitmap representation of the matrix barcode stream.

10. The method of claim 9, wherein the digital image presented via the display is a digital video including a plurality of image frames representing one or more of the plurality of matrix barcodes in the matrix barcode stream.

11. A system for enabling data transfer from a first mobile device using coded data images at a wellsite, the system comprising:
    a display;
    at least one processor coupled to the display; and
    a memory coupled to the processor, the memory including processor-readable instructions stored therein, which when executed by the processor, cause the processor to perform functions including functions to:
    obtain, from a computing device associated with a first of a plurality of service providers at the wellsite, wellsite data in a first format supported by only the first service provider;
    convert the obtained wellsite data from the first format into a second format supported by a second service provider at the wellsite;
    generate at least one coded data image based on the converted wellsite data; and
    present via the display a representation of the generated coded data image for transfer to a second mobile device located at the wellsite via an image capture device of the second mobile device wherein the second mobile device is associated with the second service provider.

12. The system of claim 11, wherein the first and second formats are proprietary data formats associated with computing systems of the respective first and second service providers.

13. The system of claim 11, wherein the first format is a proprietary data format supported by only the first service provider, and the second format is a portable text-based data format supported by each of the first and second service providers.

14. The system of claim 13, wherein the portable text-based data format is based on an extensible markup language (XML) standard for wellsite information transfer.

15. The system of claim 13, wherein the functions performed by the processor include functions to:
    convert the wellsite data from the proprietary data format into the portable text-based format;
    generate a binary version of the converted wellsite data in the portable text-based data format;

compress the binary version of the wellsite data using a binary data compression format to generate a compressed binary representation of the wellsite data; and
embed the compressed binary representation of the wellsite data into the coded data image being generated.

16. The system of claim 11, wherein the image capture device of the second mobile device is a digital image capture device, and the representation of the coded data image is a digital image of the matrix barcode presented via the display for transfer to the second mobile device via a digital image capture device of the second mobile device.

17. The system of claim 16, wherein the coded data image is a matrix barcode and the digital image capture device of the second mobile device is a digital camera utilized by a matrix barcode reader application executable at the second mobile device.

18. The system of claim 17, wherein the generated coded data image is a matrix barcode stream including a plurality of matrix barcodes, and the digital image presented via the display is an animated bitmap representation of the matrix barcode stream.

19. The system of claim 18, wherein the digital image presented via the display is a digital video including a plurality of image frames representing one or more of the plurality of matrix barcodes in the matrix barcode stream.

20. A computer-readable storage medium having instructions stored therein, which when executed by a processor cause the processor to execute functions, including functions to:
obtain, from a computing device associated with a first of a plurality of service providers at a wellsite, wellsite data in a first format supported by only the first service provider;
convert the obtained wellsite data from the first format into a second format supported by a second service provider at the wellsite;
generate at least one coded data image based on the converted wellsite data; and
present, via an output device of a first mobile device located at the wellsite, a representation of the generated coded data image for transfer to a second mobile device located at the wellsite via an image capture device of the second mobile device, wherein the second mobile device is associated with the second service provider.

* * * * *